United States Patent
Lho et al.

(10) Patent No.: US 12,191,488 B2
(45) Date of Patent: Jan. 7, 2025

(54) POSITIVE ELECTRODE ACTIVE MATERIAL AND POSITIVE ELECTRODE INCLUDING THE SAME

(71) Applicant: LG Energy Solution, Ltd., Seoul (KR)

(72) Inventors: Eun Sol Lho, Daejeon (KR); Jin Tae Hwang, Daejeon (KR); Su Yeon Oh, Daejeon (KR); Byung Chun Park, Daejeon (KR); Sang Min Park, Daejeon (KR); Sang Wook Lee, Daejeon (KR); Seul Ki Kim, Daejeon (KR); Hyeong Il Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/540,301

(22) Filed: Dec. 14, 2023

(65) Prior Publication Data

US 2024/0213471 A1    Jun. 27, 2024

(30) Foreign Application Priority Data

Dec. 15, 2022    (KR) .......................... 10-2022-0176301

(51) Int. Cl.
| | | |
|---|---|---|
| H01M 4/525 | (2010.01) | |
| H01M 4/36 | (2006.01) | |
| H01M 4/485 | (2010.01) | |
| H01M 10/052 | (2010.01) | |
| H01M 4/02 | (2006.01) | |

(52) U.S. Cl.
CPC ........... *H01M 4/525* (2013.01); *H01M 4/366* (2013.01); *H01M 4/485* (2013.01); *H01M 10/052* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 2018/0233740 A1 | 8/2018 | You et al. | |
| 2019/0221829 A1 | 7/2019 | Kim et al. | |
| 2020/0295367 A1* | 9/2020 | Yoo | H01M 4/505 |
| 2021/0020902 A1 | 1/2021 | Yoo et al. | |
| 2021/0234200 A1 | 7/2021 | Kim et al. | |
| 2022/0069289 A1 | 3/2022 | Park et al. | |
| 2022/0384780 A1 | 12/2022 | Jang et al. | |
| 2023/0275209 A1 | 8/2023 | Yoo et al. | |
| 2024/0047668 A1 | 2/2024 | Lho et al. | |

FOREIGN PATENT DOCUMENTS

| | | |
|---|---|---|
| KR | 20140081663 A | 7/2014 |
| KR | 20170045833 A | 4/2017 |
| KR | 20190059241 A | 5/2019 |
| KR | 20190117199 A | 10/2019 |
| KR | 20210006422 A | 1/2021 |
| KR | 20210058489 A | 5/2021 |
| KR | 20220030027 A | 3/2022 |
| KR | 102410700 B1 | 6/2022 |
| KR | 20220092450 A | 7/2022 |
| KR | 20220126994 A | 9/2022 |
| KR | 20220148138 A | 11/2022 |
| KR | 20220160919 A | 12/2022 |

OTHER PUBLICATIONS

International Search Report for Application No. PCT/KR2023/020783 mailed Mar. 22, 2024, pp. 1-4. [See p. 2, categorizing the cited references].

* cited by examiner

*Primary Examiner* — Zhongqing Wei
(74) *Attorney, Agent, or Firm* — Lerner David LLP

(57) ABSTRACT

A positive electrode active material includes a nickel-based lithium composite metal oxide having a Ni content of 80 atm % or greater among transition metals except lithium, and in the form of a single particle or pseudo-single particle. The nickel-based lithium composite metal oxide has a coating layer positioned on the surface thereof, wherein the coating layer contains cobalt. The positive electrode active material also satisfies [Equation 1] $1 \leq XY/Z \leq 3$, wherein X is the molar number (mol %) of Co in the coating layer based on 100 moles of the nickel-based lithium composite metal oxide, Y is the average particle diameter (μm) of nodules of the nickel-based lithium composite metal oxide, and Z is $D_{50}$ (μm) of the positive electrode active material, wherein Z is from 5 μm to 12 μm.

11 Claims, No Drawings

POSITIVE ELECTRODE ACTIVE MATERIAL AND POSITIVE ELECTRODE INCLUDING THE SAME

CROSS-REFERENCE TO RELATED APPLICATIONS

This application claims the benefit of Korean Patent Application No. 10-2022-0176301, filed on Dec. 15, 2022, in the Korean Intellectual Property Office, the disclosure of which is incorporated herein in its entirety by reference.

TECHNICAL FIELD

The present disclosure relates to a positive electrode active material and a positive electrode including the same.

BACKGROUND

As technology development and demand for mobile devices have increased, the demand for secondary batteries as an energy source has been rapidly increased. Among such secondary batteries, lithium secondary batteries having high energy density and voltage, long cycle life, and low self-discharge rate have been commercialized and widely used. In addition, with the recent development of technologies such as electric vehicles, the demand for high-capacity secondary batteries is increasing.

When lithium secondary battery is charged and discharged, the volume expansion-contraction is repeated during cycles, so that a positive electrode is deteriorated and cracked, which reduces the capacity of a battery cell and increases resistance. Particularly, when a high-nickel positive electrode active material having a Ni content of 80 atm % or greater is used to increase the capacity of a secondary battery, the structural stability is reduced, resulting in generating a large number of cracks, so that the lifespan of the secondary battery is severely degraded as a cycle progresses.

In order to overcome such a disadvantage, single particle or pseudo-single particle can be used. However, when a positive electrode active material in the form of a single particle or pseudo-single particle is used, there is a reduced contact interface with an electrolyte, and therefore there are problems in that a lithium ion diffusion path is longer than that of a typical positive electrode active material in the form of a secondary particle, and that output performance is poor due to the formation of a surface rock salt structure caused by over-firing. Such output performance degradation tends to intensify as the size of the single particle or pseudo-particle increases.

Accordingly, in order to compensate for the problems of a single particle, a lithium secondary battery has been typically manufactured by mixing small-diameter particles and secondary particles in a bimodal manner. However, when a bimodal positive electrode active material is applied as described above, there is a problem in that the breakage of relatively weak secondary particles further increases, thereby increasing side reactions with an electrolyte.

SUMMARY

Technical Problem

An aspect of the present disclosure is to provide a high-nickel positive electrode active material in the form of a single particle or pseudo-single particle having excellent lifespan properties and excellent overall properties such as capacity and output properties, and a secondary battery to which the positive electrode active material is applied.

Through extensive and intensive studies and experiments to solve the problem described above, the inventors of the present disclosure developed a high-nickel positive electrode active material in the form of a single particle or pseudo-single particle, wherein the D50 of the positive electrode active material, the average particle diameter of nodules, and the content of Co satisfy a specific relationship to provide stable crystal structure and improve lifespan properties and overall properties such as capacity and output properties.

Technical Solution

According to an aspect of the present disclosure, there is provided a positive electrode active material including a nickel-based lithium composite metal oxide having a Ni content of 80 atm % or greater among transition metals except lithium, and in the form of a single particle or pseudo-single particle, and a coating layer positioned on the surface of the nickel-based lithium composite metal oxide, and containing cobalt, wherein the positive electrode active material satisfies Equation 1 below.

$$1 \leq XY/Z \leq 3 \qquad \text{[Equation 1]}$$

In Equation 1 above, X is the molar number (mol %) of Co in the coating layer based on 100 moles of the nickel-based lithium composite metal oxide, Y is the average particle diameter (μm) of nodules of the nickel-based lithium composite metal oxide, and Z is $D_{50}$ (μm) of the positive electrode active material, and the Z is 5 μm to 12 μm.

According to another aspect of the present disclosure, there is provided a positive electrode including a positive electrode active material layer containing the positive electrode active material.

Advantageous Effects

A high-nickel positive electrode active material in the form of a single particle or pseudo-single particle, according to an aspect of the present disclosure, may achieve an effect of lowering surface resistance and reducing the generation of cracks by adjusting the $D_{50}$ of the positive electrode active material, the average particle diameter of nodules, and the content of Co contained in a coating layer formed on the surface of the positive electrode active material to an appropriate ratio.

That is, the interfacial resistance of a positive electrode active material may be minimized by controlling the number of nodules in each of positive electrode active material particles and the amount of cobalt coating to be within a range that satisfies a certain equation.

That is, a lithium secondary battery including a positive electrode to which the positive electrode active material of the present disclosure is applied has an effect in that lifespan properties are improved, the resistance is low, and output properties are excellent.

DETAILED DESCRIPTION

It will be understood that terms or words used in the present disclosure and claims shall not be construed as being limited to having meanings defined in commonly used dictionaries, but should be interpreted as having meanings and concepts consistent with the technical idea of the present disclosure based on the principle that an inventor may appropriately define concepts of the terms to best explain aspects of the present disclosure.

In the present disclosure, a "single particle" is a particle composed of one single nodule. In the present disclosure, a "pseudo-single particle" refers to a particle which is a complex formed of 10 or fewer nodules.

In the present disclosure, a "nodule" refers to a particle unit body constituting a single particle and a pseudo-single particle, wherein the nodule may be a single crystal with no crystalline grain boundaries, or may be a polycrystal with no grain boundaries in appearance when observed in a range of vision of 5,000 to 20,000 times using a scanning electron microscope (SEM).

In the present disclosure, a "secondary particle" refers to a particle formed by the agglomeration of a plurality of tens to hundreds of primary particles. In some examples, the secondary particle may be an agglomerate of 40 or more primary particles.

The term "particle" used in the present disclosure may include any one or all of a single particle, a pseudo-single particle, a primary particle, a nodule, and a secondary particle.

In the present disclosure, the "Dn" of a positive electrode active material refers to the particle diameter at an n % point in a volume cumulative distribution according to particle diameters. That is, $D_{50}$ is the particle diameter at 50% point in a volume cumulative distribution according to particle diameters, and $D_{90}$ is the particle size at 90% point of the volume cumulative distribution according to particle diameters, and $D_{10}$ is the particle size at 10% point of the volume cumulative distribution according to particle diameters. The DN may be measured using a laser diffraction method. Specifically, powder to be measured is dispersed in a dispersion medium, and then introduced into a commercially available laser diffraction particle size measurement device (for example, Microtrac S3500) to calculate a particle size distribution by measuring a difference in diffraction pattern according to particle sizes when particles pass through a laser beam. $D_{10}$, $D_{50}$, and $D_{90}$ may be respectively measured by calculating the particle diameter at a point of 10%, 50%, and 90% in a volume cumulative distribution according to particle diameters in the measurement device.

In the present disclosure, a "nodule" means the smallest particle unit distinguished as one mass when a cross-section of a positive electrode active material is observed through a scanning electron microscope (SEM), and may be formed of one crystal grain, or formed of a plurality of crystal grains. The average particle diameter of the nodules may be measured by a method of measuring the size of each particle distinguished in a cross-sectional SEM image of positive electrode active material particles, and obtaining an arithmetic mean value thereof.

In the present disclosure, an "average crystal grain size" is measured by analyzing XRD data, which is obtained by performing X-ray diffraction analysis on positive electrode active material powder, by the Rietveld refinement method. At this time, the X-ray diffraction analysis was performed by, using Bruker D8 Endeavor (light source: Cu-Kα, λ=1.54 Å) equipped with a LynxEye XE-T-position sensitive detector, putting a sample into a groove of a general powder holder, and then evenly leveling the surface of the sample using a slide glass, followed by filling the groove with the sample such that the height of the sample is the same as the height of the edge of the holder, under the conditions of step size=0.02° and total scan time=about 20 minutes for a FDS 0.5° and 2θ=15° to 90° region. The Rietveld refinement was performed on the measured data in consideration of charge (+3 for metals in transition metal sites, and +2 for Ni in Li sites) and cation mixing in each site. Specifically, for instrumental broadening at the time of grain size analysis, Fundamental Parameter Approach (FPA) implemented in the Bruker TOPAS program was used, and when fitting, all the peaks in the measurement range were used. The peak shape was fitted using only the Lorenzian contribution as the First Principle (FP) among peak types available in the TOPAS, and strain was not considered.

In the present disclosure, "strain" refers to the distortion of a lattice, that is, micro-deformation, caused by a defect. The strain was measured by analyzing XRD data, which was obtained by performing X-ray diffraction analysis on positive electrode active material powder, by the Rietveld refinement method. At this time, the X-ray diffraction analysis was performed by, using Bruker D8 Endeavor (light source: Cu-Kα, λ=1.54 Å) equipped with a LynxEye XE-T-position sensitive detector, putting a sample into a groove of a general powder holder, and then evenly leveling the surface of the sample using a slide glass, followed by filling the groove with the sample such that the height of the sample is the same as the height of the edge of the holder, under the conditions of step size=0.02° and total scan time=about 20 minutes for a FDS 0.5° and 2θ=15° to 90° region. The Rietveld refinement was performed on the measured data in consideration of charge (+3 for metals in transition metal sites, and +2 for Ni in Li sites) and cation mixing in each site. Specifically, for instrumental broadening at the time of strain analysis, Fundamental Parameter Approach (FPA) implemented in the Bruker TOPAS program was used, and when fitting, all the peaks in the measurement range were used. The peak shape was fitted using only the Lorenzian contribution as the First Principle (FP) among peak types available in the TOPAS.

Positive Electrode Active Material

A positive electrode active material of the present disclosure is characterized by satisfying Equation 1 below.

$$1 \le XY/Z \le 3 \qquad \text{[Equation 1]}$$

In general, since cobalt facilitates the formation of layered structures, it is known that the resistance of a positive electrode active material is reduced when the cobalt content is high. In addition, when a positive electrode active material is composed of an agglomerate of a large number of primary particles, the primary particle and the interface between the primary particles become movement paths of lithium ions, so that it is known that the more the interfaces between the primary particles, the higher the lithium mobility, which reduces resistance. However, according to the research of the inventors of the present disclosure, in the case of a high-nickel positive electrode active material in the form of a single particle or pseudo-single particles, it has been determined that there is an effect of suppressing resistance if the cobalt content and the number of interfaces between nodules in an active material particle satisfy a specific relationship. At this time, the number of interfaces between nodules in the particle may be defined as the ratio of D50 (Z) of the positive electrode active material to the average particle diameter (Y) of the nodules. In the case of a high-nickel positive electrode active material in the form of a single particle or pseudo-single particles, it has been determined that even if the Co content is high, if a Z/Y value does not satisfy a specific range, resistance increases, and even if the Z/Y value increases, if the Co content does not satisfy a specific range, the resistance increases.

In Equation 1 above, X is the molar number (mol %) of Co in the coating layer with respect to 100 moles of the nickel-based lithium composite metal oxide. The X may be 1 to 5 mol %, and in some examples, may be 1 to 3 mol %. When the content of cobalt in the coating layer satisfies the above range, the micro-structure of the single-particle and/or pseudo-single particle nickel-based lithium composite metal oxide is stabilized, thereby reducing the generation of cracks, so that the collapse of the positive electrode active material is suppressed even when a cycle proceeds.

In Equation 1 above, Y is an average particle diameter (μm) of nodules of the nickel-based lithium composite metal oxide. The Y may be 1 μm to 10 μm, in some examples, 6 μm to 8 μm, and in other examples, 2 μm to 7 μm. When the average particle diameter (μm) of nodules of the nickel-based lithium composite metal oxide satisfies the above range, a specific surface area is reduced, so that high-temperature durability is excellent, and particle breakage is reduced, so that gases are reduced when running a lithium secondary battery.

In Equation 1 above, Z is a $D_{50}$ (μm) of the positive electrode active material. The Z may be 5 μm to 12 μm, in some examples, 6 μm to 10 μm, and in other examples, 6.2 μm to 8 μm. The positive electrode active material of the present disclosure has a $D_{50}$ greater than that of a typical single particle or pseudo-single particle, and thus, has excellent tap density and roll-pressing density and a small BET, so that there is an effect of improving slurry processability and thermal stability. In addition, the positive electrode active material of the present disclosure has a $D_{50}$ in the above range, and thus, does not cause the problem of slurry aggregation, and has excellent electrolyte impregnation, thereby having an effect in which the output and lifespan properties of a lithium secondary battery including the positive electrode active material are excellent.

In Equation 1 above, the Z/Y refers to the number of nodules included in a single positive electrode active material particle or the number of interfaces between nodules in the active material particle.

In the positive electrode active material of the present disclosure, the Z/Y may be 1 to 3, in some examples, 1 to 2, and in other examples, 1.1 to 1.5. When the average diameter of the nodules of the nickel-based lithium composite metal oxide and the $D_{50}$ of the positive electrode active material satisfy the above ranges, the particle strength is high, and the roll-pressing density is high, which are suitable for constituting a high-energy density electrode, and even when the roll-pressing rate is high, there is less particle breakage, so that lifespan properties and high-temperature storage properties are improved.

In some examples, the ratio of a positive electrode active material having a D50 of from 5 μm to 7 μm with respect to an entire positive electrode active material is 80 vol % or greater.

The positive electrode active material of the present disclosure may include a lithium by-product in an amount of 1 mol % to 5 mol %, and in some examples, in an amount of 1 mol % to 3 mol %, with respect to the nickel-based lithium composite metal oxide. The positive electrode active material of the present disclosure is characterized by having a small amount of lithium by-products even when over-fired to include a single particle.

The positive electrode active material of the present disclosure includes a nickel-based lithium composite metal oxide having a Ni content of 80 atm % or greater among transition metals except lithium, and in the form of a single particle or pseudo-single particle, and a coating layer positioned on the surface of the nickel-based lithium composite metal oxide, and the coating layer contains cobalt.

The nickel-based lithium composite metal oxide included in the positive electrode active material of the present disclosure may have a nickel content of 80 atm % or greater among transition metals except lithium, and in some examples, may have 85 atm % or greater. When the nickel is less than 80 atm %, the capacity of the positive electrode active material decreases, so that there is a problem in that the positive electrode active material cannot be applied to electrochemical devices that require high capacity.

In some examples, the nickel-based lithium composite metal oxide included in the positive electrode active material of the present disclosure may have a composition represented by Formula 2 below.

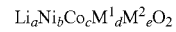

[Formula 2]

In Formula 2 above, $M^1$ may be Mn, Al, or a combination thereof, and $M^2$ may be one or more including Zr, W, Y, Ba, Ca, Ti, Mg, Ta, or Nb.

a represents the molar ratio of lithium in the nickel-based lithium composite metal oxide, and may satisfy $0.80 \leq a \leq 1.2$, in some examples, $0.95 \leq a \leq 1.08$, and in other examples, $1 \leq a \leq 1.08$.

b represents the molar ratio of nickel among metal elements except lithium in the nickel-based lithium composite metal oxide, and may satisfy $0.80 \leq b \leq 0.95$, or $0.83 \leq b \leq 0.93$. When the nickel content satisfies the above range, it is possible to implement high-capacity properties.

c represents the molar ratio of cobalt among metal elements except lithium in the nickel-based lithium composite metal oxide, and may satisfy $0 < c < 0.20$, $0 < c \leq 0.15$, or $0.01 \leq c \leq 0.10$.

d represents the molar ratio of the $M^1$ among metal elements except lithium in the nickel-based lithium composite metal oxide, and may satisfy $0 < d < 0.20$, $0 < d \leq 0.15$, or $0.01 \leq d \leq 0.10$.

e represents the molar ratio of the $M^2$ among metal elements except lithium in the nickel-based lithium composite metal oxide, and may satisfy $0 \leq e \leq 0.10$, or $0 \leq e \leq 0.05$.

Typically, it has been common to use, as a positive electrode active material of a lithium secondary battery, a spherical secondary particle in which tens to hundreds of primary particles are agglomerated. However, in the case of a positive electrode active material in the form of a secondary particle in which a large number of primary particles are agglomerated, particle breakage is likely to occur wherein primary particles are broken off during a roll-pressing process when manufacturing a positive electrode, and there is a problem in that cracks are generated inside the particle during a charge/discharge process. When the particle of the positive electrode active material is broken or cracks are generated inside the particle, the contact area with an electrolyte increases, so that there is a problem in that gas generation increases due to a side reaction with the electrolyte.

In comparison, a positive electrode active material in the form of a single particle composed of one primary particle or in the form of a pseudo-single particle in which 10 or fewer primary particles are agglomerated has higher particle strength than a typical positive electrode active material in the form of a secondary particle in which tens to hundreds of primary particles are agglomerated, so that the particle breakage hardly occurs during roll-pressing. In addition, in the case of the positive electrode active material in the form of a single particle or pseudo-single particle, the number of primary particles constituting the particle is small, there is little change due to volume expansion and contraction of the primary particles during charging and discharging, and accordingly, the generation of cracks inside the particles is significantly reduced.

Therefore, when the positive electrode active material composed of a single particle and/or pseudo-single particle is used, it is possible to significantly suppress the decrease in lifespan properties caused by the particle breakage and generation of internal cracks.

The nickel-based lithium composite metal oxide may have an average crystallite size of 170 nm to 300 nm, in some examples, 170 nm to 250 nm, and in other examples, 180 nm to 230 nm. When the average crystallite size is satisfied, a proper degree of firing is achieved, so that there is an effect in that output performance is excellent due to little surface rock salt structure formation.

The nickel-based lithium composite metal oxide may have a strain value of $200 \times 10^{-6}$ to $380 \times 10^{-6}$, in some examples, $210 \times 10^{-6}$ to $370 \times 10^{-6}$. When the above strain range is satisfied, the degree of completion of a crystal structure is high, so that the positive electrode active material has a stable crystal structure and has excellent lifespan performance.

The positive electrode active material of the present disclosure includes a coating layer positioned on the surface of the nickel-based lithium composite metal oxide. The coating layer is formed on the surface of the positive electrode active material and the surface of a portion or all of a nodule, and may contain cobalt.

The coating layer may have a composition represented by Formula 3 below.

$$Li_xCo_yO_2 \quad \text{[Formula 3]}$$

The x represents the molar ratio of lithium in the coating layer, and may satisfy $0.8 \leq x \leq 1.2$, and in some examples, $1.00 \leq x \leq 1.02$.

The y represents the molar ratio of Co in the coating layer, and may satisfy $0.5 \leq y \leq 1.5$, and in some examples, $0.8 \leq y \leq 1.2$.

The coating layer may block contact between the positive electrode active material and an electrolyte included in a lithium secondary battery to suppress the occurrence of side reactions, so that lifespan properties may improve, and in addition, the filling density of the positive electrode active material may increase.

The coating layer may be formed on the entire surface of the positive electrode active material, or may be partially formed. In some examples, when the coating layer is partially formed on the surface of the positive electrode active material, the coating layer may be formed to be 20% or more of the total area of the positive electrode active material. When the area of the coating layer is less than 20%, the effect of improving the lifespan properties and improving the filling density in accordance with the formation of the coating layer may be insignificant.

In addition, the coating layer may be formed at a thickness ratio of 1/10000 to 1/100 with respect to an average particle diameter of the positive electrode active material particles. If the thickness ratio of the coating layer with respect to the particles of the positive electrode active material is less than 1/10000, the effect of improving the lifespan properties and improving the filling density in accordance with the formation of the coating layer is insignificant, and if the thickness ratio is greater than 1/100, there is a risk in that battery properties may be degraded.

Method for Preparing Positive Electrode Active Material

A method for preparing a positive electrode active material according to the present disclosure may include preparing a nickel-based lithium composite metal oxide having a Ni content of 80 atm % or greater among transition metals excluding lithium, and mixing the nickel-based lithium composite metal oxide and a solution containing a cobalt raw material, followed by performing a first heat treatment to form a coating layer on the surface of the nickel-based lithium composite metal oxide.

First, a nickel-based lithium composite metal oxide in the form of a single particle, a pseudo-single particle, or a combination thereof, and having a nickel content of 80 atm % or greater in metal elements excluding lithium may be prepared.

The nickel-based lithium composite metal oxide may be a commercially available product purchased and used, or may be prepared by using a method for manufacturing a nickel-based lithium composite metal oxide known in the art. For example, the nickel-based lithium composite metal oxide may be prepared by mixing a lithium raw material and a nickel-based lithium composite metal oxide precursor, and then firing the mixture.

The nickel-based lithium composite metal oxide precursor may be, for example, represented by Formula A or Formula B below.

$$[Ni_pCo_qM^1_rM^2_s](OH)_2 \quad \text{[Formula A]}$$

$$[Ni_pCo_qM^1_rM^2_s]O \cdot OH \quad \text{[Formula B]}$$

In Formula A and Formula B above, $M^1$ may be one or more selected from Mn or Al, and in some examples, may be Mn or a combination of Mn and Al.

In Formula A and Formula B above, $M^2$ may be one or more including Zr, B, W, Mo, Cr, Nb, Mg, Hf, Ta, La, Ti, Sr, Ba, Ce, F, P, S, or Y.

p represents the molar of nickel among metal elements in the precursor, and may satisfy $0.80 \leq p < 1.0$, $0.80 \leq p \leq 0.98$, or $0.80 \leq p \leq 0.95$.

q represents the molar of cobalt among metal elements in the precursor, and may satisfy $0 < q \leq 0.2$, $0 < q \leq 0.15$, or $0.01 \leq q \leq 0.10$.

r represents the molar ratio of a $M^1$ element among metal elements in the precursor, and may satisfy $0 < r \leq 0.2$, $0 < r \leq 0.15$, or $0.01 \leq r \leq 0.1$.

s represents the molar ratio of a $M^2$ element among metal elements in the precursor, and may satisfy $0 \leq s < 0.1$, or $0 \leq s \leq 0.05$.

The lithium raw material may be, for example, at least one including lithium carbonate ($Li_2CO_3$), lithium hydroxide (LiOHH$_2$O), lithium hydroxide anhydride (LiOH), LiNO$_3$, CH$_3$COOLi, or Li$_2$(COO)$_2$, and in some examples, may be lithium carbonate (Li$_2$CO$_3$), lithium hydroxide (LiOHH$_2$O), or a combination thereof.

When preparing the positive electrode active material, the nickel-based lithium composite metal oxide precursor and the lithium raw material may be mixed such that the molar ratio of Li:transition metal is 1:1 to 1.3:1, and in some examples, 1:1 to 1.1:1. When the blending ratio of the nickel-based lithium composite metal oxide precursor and the lithium raw material satisfies the above range, the crystal structure of the positive electrode active material is allowed to be developed smoothly, and a positive electrode active material with excellent physical properties may be prepared. When the content of the lithium raw material is too small, the crystal structure will not develop properly, and when the content is too large, unreacted Li will remain as a by-product, which may cause capacity degradation, gas generation, and the like.

When conditions such as firing temperature and duration are appropriately adjusted, the average particle diameter of the nodules of the nickel-based lithium composite metal oxide may be adjusted to an appropriate range.

The firing may be performed at a temperature of 700° C. to 1000° C., in some examples, 700° C. to 900° C., and in other examples, 700° C. to 850° C. When the firing temperature is lower than 700° C., the raw material may remain in the particles due to an insufficient reaction, thereby degrading the high-temperature stability of a battery, and the volume density and crystallinity may be degraded, thereby lowering the structural stability. Meanwhile, when the firing temperature exceeds 1,000° C., the particles may grow non-uniformly, and the disintegration of the particles may become difficult, thereby causing capacity degradation and the like.

The firing may be performed for 5 hours to 24 hours, in some examples, 10 hours to 24 hours. When the firing duration is less than 5 hours, the reaction time is too short to obtain a high-crystalline positive electrode active material, and when more than 24 hours, the particle size may become excessively large, and productivity efficiency may be degraded.

Next, the prepared nickel-based lithium composite metal oxide, and a solution containing a cobalt raw material may be mixed and heat treated to form a coating layer on the surface of the nickel-based lithium composite metal oxide.

The nickel-based lithium composite metal oxide, and a solution containing a cobalt raw material may be mixed, stirred, separated by filtration, and then heat treated in an oxygen atmosphere.

The cobalt raw material may be mixed to be 0.8 parts by weight to 5 parts by weight, in some examples, 1 part by weight to 4 parts by weight, and in other examples, 1.5 parts by weight to 3 parts by weight, based on 100 parts by weight of the nickel-based lithium composite metal oxide. When the content of the cobalt raw material satisfies the above range, the occurrence of cracks at the interface between the nodules is suppressed, thereby improving stability and initial capacity.

As the cobalt raw material, for example, cobalt acetate, cobalt sulfate, cobalt chloride, cobalt nitrate, or the like may be used.

Meanwhile, the solution containing the cobalt raw material may be prepared by dissolving the cobalt raw material in a solvent such as water or ethanol.

When the nickel-based lithium composite metal oxide is added to the solution containing the cobalt raw material, mixed, and then stirred, cobalt contained in the solution reacts with a lithium by-product present on the surface of the nickel-based lithium composite metal oxide, thereby forming a coating layer on the surface.

Then, nickel-based lithium composite metal oxide powder having the coating layer formed thereon is obtained by performing separation by filtration and then heat treatment.

At this time, the filtration may be performed by putting filter paper into a filtration flask and then performing vacuum decompression, and drying may be performed at 100° C. to 180° C., in some examples, 120° C. to 160° C., for 10 hours to 24 hours, in some examples, 12 hours to 22 hours.

The heat-treatment is to form a coating layer by fixing cobalt on the surface of the nickel-based lithium composite metal oxide, and may be performed at a temperature of 630° C. to 800° C., in some examples, 650° C. to 750° C. When the heat-treatment temperature is within the above range, the cobalt raw material sufficiently reacts with the lithium by-product on the surface, so that the coating layer is easily formed.

The heat-treatment may be performed for 3 hours to 8 hours, in some examples, for 4 hours to 7 hours. When the heat-treatment duration is within the above range, a coating layer with an appropriate thickness may be formed, and production efficiency may be improved.

Positive Electrode

A positive electrode according to the present disclosure includes the above-described positive electrode active material of the present disclosure. The positive electrode includes a positive electrode current collector, and a positive electrode active material layer formed on the positive electrode current collector, wherein the positive electrode active material layer includes the positive electrode active material according to the present disclosure. Since the positive electrode active material has been described above, a detailed description thereof will be omitted, and hereinafter, only the rest of the components will be described in detail.

The positive electrode current collector of the present disclosure may include a metal having high conductivity, and is not particularly limited as long as the positive electrode active material layer is easily adhered thereto, and the positive electrode current collector is not reactive in a voltage range of a battery. As the positive electrode current collector, for example, stainless steel, aluminum, nickel, titanium, fired carbon, or aluminum or stainless steel that is surface-treated with one of carbon, nickel, titanium, silver, and the like may be used. Also, the positive electrode current collector may typically have a thickness of 3 μm to 500 μm, and microscopic irregularities may be formed on the surface of the current collector to improve the adhesion of the positive electrode active material. For example, the positive electrode current collector may be used in various forms such as a film, a sheet, a foil, a net, a porous body, a foam, a non-woven body, and the like.

The positive electrode active material included in the positive electrode active material layer of the present disclosure may be included in an amount of 95 wt % to 100 wt %, in some examples, 98 wt % to 100 wt %, and in other examples, 99 wt % to 100 wt8, based on the weight of the entire positive electrode active material included in the positive electrode active material layer. In some examples, the positive electrode active material in the form of a single particle or pseudo-single particle may be included 100% alone. When the content of the positive electrode active material of the present disclosure satisfies the above range, properties of sufficient lifespan may be obtained. This is because when a positive electrode active material in the form of a secondary particle is included in an amount greater than 5 wt % of the entire positive electrode active material, a side reaction with an electrolyte increases due to fine powder generated from the secondary particle during electrode manufacturing and charging and discharging, so that the effect of suppressing gas generation is reduced.

The positive electrode active material layer of the present disclosure may selectively include a conductive material and a binder, as needed, together with the positive electrode active material.

At this time, the positive electrode active material may be included in an amount of 80 wt % to 99 wt %, and, in some examples, may be included in an amount of 85 wt % to 98.5 wt %, based on the total weight of the positive electrode active material layer, and when included in the above content ranges, excellent capacity properties may be exhibited.

The conductive material is used to impart conductivity to an electrode, and any conductive material may be used without particular limitation as long as it has electron conductivity without causing a chemical change in a battery to be constituted. Some examples thereof may include graphite such as natural graphite or artificial graphite; a carbon-based material such as carbon black, acetylene black, Ketjen black, channel black, furnace black, lamp black, thermal black, and carbon fiber; metal powder or metal fiber of such as copper, nickel, aluminum, and silver; a conductive tube such as a carbon nanotube; a conductive whisker such as a zinc oxide whisker and a potassium titanate whisker; a conductive metal oxide such as a titanium oxide; or a conductive polymer such as a polyphenylene derivative, and any one thereof or a mixture of two or more thereof may be used. The conductive material may be included in an amount of 0.1 wt % to 15 wt % based on the total weight of the positive electrode active material layer.

The binder serves to improve the bonding between positive electrode active material particles and the adhesion between the positive electrode active material and the current collector. Some examples thereof may include polyvinylidene fluoride (PVDF), a polyvinylidene fluoride-hexafluoropropylene copolymer (PVDF-co-HFP), polyvinyl alcohol, polyacrylonitrile, polymethymethaxrylate, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer (EPDM), a sulfonated EPDM, styrene-butadiene rubber (SBR), fluorine rubber, a poly acrylic acid, a polymer having the hydrogen thereof substituted with Li, Na, or Ca, or various copolymers thereof, and any one thereof or a mixture of two or more thereof may be used. The binder may be included in an amount of 0.1 wt % to 15 wt % based on the total weight of the positive electrode active material layer.

The positive electrode may be manufactured by a typical method for manufacturing a positive electrode. A positive electrode active material is prepared, a composition for forming a positive electrode active material layer is prepared by selectively dissolving or dispersing a binder, a conductive material, and a dispersant as needed in a solvent may be prepared. The composition for forming a positive electrode active material layer may be applied, dried, and then roll-pressed to manufacture a positive electrode.

The solvent may be a solvent commonly used in the art, and may be dimethyl sulfoxide (DMSO), isopropyl alcohol, N-methylpyrrolidone (NMP), acetone, water, or the like, and any one thereof or a mixture of two or more thereof may be used. The usage amount of the solvent is sufficient if the solvent dissolves or disperses the positive electrode active material, the conductive material, the binder, and the dispersant in consideration of the coating thickness of a slurry, and a manufacturing yield, and thereafter, allows the slurry to have a viscosity capable of exhibiting excellent thickness uniformity when applied for manufacturing the positive electrode.

In addition, in another method, the positive electrode may be manufactured by casting the composition for forming a positive electrode active material layer on a separate support, and then laminating a film peeled off from the support on a positive electrode current collector.

Electrochemical Device

Next, an electrochemical device according to the present disclosure will be described. The electrochemical device according to the present disclosure includes the above-described positive electrode of the present disclosure, and the electrochemical device may be a battery, a capacitor, or the like, and may be a lithium secondary battery.

The lithium secondary battery includes a positive electrode, a negative electrode positioned to face the positive electrode, a separator interposed between the positive electrode and the negative electrode, and an electrolyte, and since the positive electrode is the same as that described above, a detailed description thereof will be omitted, and hereinafter, only the rest of the components will be described in detail.

Also, the lithium secondary battery may selectively further include a battery case for accommodating an electrode assembly of the positive electrode, the negative electrode, and the separator, and a sealing member for sealing the battery case.

In the lithium secondary battery, the negative electrode includes a negative electrode current collector and a negative electrode active material layer positioned on the negative electrode current collector.

The negative electrode current collector is not particularly limited as long as it has high conductivity without causing a chemical change in a battery, and for example, copper, stainless steel, aluminum, nickel, titanium, fired carbon, copper or stainless steel that is surface-treated with one of carbon, nickel, titanium, silver, and the like, an aluminum-cadmium alloy, and the like may be used. Also, the negative electrode current collector may typically have a thickness of 3 μm to 500 μm, and as in the case of the positive electrode current collector, microscopic irregularities may be formed on the surface of the current collector to improve the adhesion of a negative electrode active material. For example, the negative electrode current collector may be used in various forms such as a film, a sheet, a foil, a net, a porous body, a foam, and a non-woven body.

The negative electrode active material layer selectively includes a binder and a conductive material in addition to a negative electrode active material.

As the negative electrode active material, a compound capable of reversible intercalation and de-intercalation of lithium may be used. Some examples thereof may include a carbonaceous material such as artificial graphite, natural graphite, graphitized carbon fiber, and amorphous carbon; a metallic compound alloyable with lithium such as Si, Al, Sn, Pb, Zn, Bi, In, Mg, Ga, Cd, an Si alloy, an Sn alloy, or an Al alloy; a metal oxide which may be doped and undoped with lithium such as $SiO_\beta$ ($0<\beta<2$), $SnO_2$, a vanadium oxide, and a lithium vanadium oxide; or a composite including the metallic compound and the carbonaceous material such as an Si—C composite or an Sn—C composite, and any one thereof or a mixture of two or more thereof may be used. In addition, a metal lithium thin film may be used as the negative electrode active material. In addition, low crystalline carbon, high crystalline carbon, and the like may all be used as a carbon material. Representative examples of the low crystalline carbon may include soft carbon and hard carbon, and representative examples of the high crystalline carbon may include irregular, planar, flaky, spherical, or fibrous natural graphite or artificial graphite, Kish graphite, pyrolytic carbon, mesophase pitch-based carbon fiber, mesocarbon microbeads, mesophase pitches, and high-temperature sintered carbon such as petroleum or coal tar pitch derived cokes.

The negative electrode active material may be included in an amount of 80 wt % to 99 wt % based on the total weight of the negative electrode active material layer.

The binder is a component for assisting in bonding between a conductive material, an active material, and a current collector, and is typically added in an amount of 0.1 wt % to 10 wt % based on the total weight of a negative electrode active material layer. Examples of the binder may include polyvinylidene fluoride (PVDF), polyvinyl alcohol, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer (EPDM), a sulfonated EPDM, styrene-butadiene rubber, nitrile-butadiene rubber, fluorine rubber, various copolymers thereof, and the like.

The conductive material is a component for further improving the conductivity of the negative electrode active material, and may be added in an amount of 10 wt % or less, in some examples, 5 wt % or less based on the total weight of the negative electrode active material layer. The conductive material is not particularly limited as long as it has conductivity without causing a chemical change in the battery. For example, graphite such as natural graphite or artificial graphite; carbon black such as acetylene black, Ketjen black, channel black, furnace black, lamp black, and thermal black; conductive fiber such as carbon fiber and metal fiber; metal powder such as fluorocarbon powder, aluminum powder, and nickel powder; a conductive whisker such as zinc oxide and potassium titanate; a conductive metal oxide such as titanium oxide; a conductive material such as a polyphenylene derivative, or the like may be used.

The negative electrode active material layer may be prepared by applying a negative electrode active material, and selectively, a composition for forming a negative electrode active material layer, which is prepared by dissolving or dispersing a binder and a conductive material in a solvent, on a negative electrode current collector, followed by drying, or may be prepared by casting the composition for forming a negative electrode active material on a separate support, and then laminating a film peeled off from the support on the negative electrode current collector.

Meanwhile, in the lithium secondary battery, the separator is to separate the negative electrode and the positive electrode and to provide a movement path for lithium ions, and any separator may be used without particular limitation as long as it is a separator commonly used in a lithium secondary battery, and particularly, a separator with low resistance to ion movement in an electrolyte and excellent electrolyte moisture retention ability is preferable. As the separator, a porous polymer film, for example, a porous polymer film manufactured using a polyolefin-based polymer such as an ethylene homopolymer, a propylene homopolymer, an ethylene/butene copolymer, an ethylene/hexene copolymer, an ethylene/methacrylate copolymer, or the like, or a stacked structure having two or more layers thereof may be used. Also, a typical porous non-woven fabric, for example, a non-woven fabric made of glass fiber having a high melting point, polyethylene terephthalate fiber, or the like may be used. Also, a coated separator including a ceramic component or a polymer material may be used to secure heat resistance or mechanical strength, and may selectively be used in a single-layered or multi-layered structure.

In addition, the electrolyte used in the present disclosure may be an organic liquid electrolyte, an inorganic liquid electrolyte, a solid polymer electrolyte, a gel-type polymer electrolyte, a solid inorganic electrolyte, a molten-type inorganic electrolyte, or the like, all of which may be used in the manufacturing of a lithium secondary battery, but the electrolyte is not limited thereto.

The electrolyte may include an organic solvent and a lithium salt.

As the organic solvent, any organic solvent may be used without particular limitation as long as it may serve as a medium through which ions involved in an electrochemical reaction of a battery may move. As the organic solvent, an ester-based solvent such as methyl acetate, ethyl acetate, γ-butyrolactone, or ε-caprolactone; an ether-based solvent such as dibutyl ether or tetrahydrofuran; a ketone-based solvent such as cyclohexanone; an aromatic hydrocarbon-based solvent such as benzene or fluorobenzene; a carbonate-based solvent such as dimethyl carbonate (DMC), diethyl carbonate (DEC), methylethyl carbonate (MEC), ethylmethyl carbonate (EMC), ethylene carbonate (EC), or propylene carbonate (PC); an alcohol-based solvent such as ethyl alcohol or isopropyl alcohol; nitriles such as R—CN (wherein R is a linear, branched, or cyclic hydrocarbon group having 2 to 20 carbon atoms, and may include a double-bond aromatic ring or an ether bond); amides such as dimethylformamide; dioxolanes such as 1,3-dioxolane; sulfolanes, or the like may be used. Among the above, the carbonate-based solvent is preferred, and a mixture of a cyclic carbonate (e.g., ethylene carbonate or propylene carbonate) having high ion conductivity and a high dielectric constant, which may increase charge/discharge performance of the battery, and a low-viscosity linear carbonate-based compound (e.g., ethylmethyl carbonate, dimethyl carbonate, diethyl carbonate, or the like) is more preferred.

Any compound may be used as the lithium salt without particular limitation as long as it is a compound capable of providing lithium ions used in a lithium secondary battery. Anions of the lithium salt may be at least one including $F^-$, $Cl^-$, $Br^-$, $I^-$, $NO_3^-$, $N(CN)_2^-$, $BF_4^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, or $(CF_3CF_2SO_2)_2N^-$, and as the lithium salt, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $LiI$, $LiB(C_2O_4)_2$, or the like may be used. The lithium salt may be used in a concentration range of 0.1 M to 2.0 M. When the concentration of the lithium salt is in the above range, the electrolyte has suitable conductivity and viscosity, thereby exhibiting excellent performance, and lithium ions may effectively move.

In the electrolyte, in order to improve the lifespan properties of a battery, suppress the decrease in battery capacity, and improve the discharge capacity of the battery, one or more kinds of additives, for example, a halo-alkylene carbonate-based compound such as difluoroethylene carbonate, pyridine, triethylphosphite, triethanolamine, cyclic ether, ethylenediamine, n-glyme, triamide, a hexaphosphoric nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, and the like may be further included. At this time, the additive may be included in an amount of 0.1 wt % to 5 wt % based on the total weight of the electrolyte.

As described above, a lithium secondary battery including the positive electrode according to the present disclosure stably exhibits excellent discharge capacity, output properties, and lifespan properties, and thus, is useful in the field of portable devices such as mobile phones, laptop computers, digital cameras, etc., and in the field of electric cars such as a hybrid electric vehicle (HEV).

Accordingly, according to another embodiment of the present disclosure, a battery module including the lithium secondary battery as a unit cell, and a battery pack including the battery module are provided.

The battery module or the battery pack may be used as a power source for a power tool, an electric car including an electric vehicle (EV), a hybrid electric vehicle, and a plug-in hybrid electric vehicle (PHEV), or one or more medium-to-large devices in a system for power storage.

The external shape of the lithium secondary battery of the present disclosure is not particularly limited, but may be a cylindrical shape using a can, a square shape, a pouch shape, a coin shape, or the like.

The lithium secondary battery according to the present disclosure may be used in a battery cell used as a power source for a small-sized device, and also, may be used as a unit cell in a medium-and-large-sized battery module including a plurality of battery cells.

Examples of the medium- and large-sized device include electric vehicles, hybrid electric vehicles, plug-in hybrid electric vehicles, and electric power storage systems, but are not limited thereto.

EXAMPLES

Example 1

$Ni_{0.8}Co_{0.1}Mn_{0.1}$ $(OH)_2$ as a precursor was mixed with LiOH such that the Li/Me (Ni, Co, Mn) molar ratio was 1.05, and heat treated for 10 hours at 900° C. in an oxygen atmosphere to prepare $LiNi_{0.8}Co_{0.1}Mn_{0.1}O_2$, a lithium composite transition metal oxide. The prepared nickel-based lithium composite metal oxide was in the form of a pseudo-single particle composed of one to three nodules, and the average particle diameter (μm) of the nodules was 5.69 μm.

0.67 moles of $Co_3O_4$, a cobalt raw material, were added to 100 moles of the prepared nickel-based lithium composite metal oxide, and the mixture was fired at 700° C. for 5 hours. The $D_{50}$ of the prepared positive electrode active material was 6.25 μm, and the XY/Z value was 1.82.

The positive electrode active material, carbon nanotubes, and PVdF, which is a binder, were mixed in an NMP solvent at a weight ratio of 97.5:1.0:1.5 to prepare a positive electrode slurry. The positive electrode slurry was applied on one surface of an aluminum current collector (thickness of 12 μm), and dried at 130° C. to form a positive electrode active material layer on the aluminum collector, and then roll-pressed to manufacture a positive electrode.

Meanwhile, graphite as a negative electrode active material, a carbon conductive material (SuperC65), carboxymethylcellulose (Daicell 2200), and a styrene-butadiene rubber binder (BM-L302) were mixed at a weight ratio of 96:20.5:21:2.5 and added to water, which is a solvent, to prepare a negative electrode slurry. The composition for forming a negative electrode was applied on a copper foil having a thickness of 8 μm, dried, and then roll-pressed to manufacture a negative electrode.

The positive electrode and the negative electrode manufactured above were stacked together with a polyolefin separator to manufacture an electrode assembly, and then the electrode assembly was placed inside a battery case, followed by injecting, into the battery case, an electrolyte in which 1 M of $LiPF_6$ was dissolved in a mixed solvent prepared by mixing ethylenecarbonate:diethylcarbonate at a ratio of 3.7.

Example 2

$Ni_{0.8}Co_{0.1}Mn_{0.1}$ $(OH)_2$ as a precursor was mixed with LiOH such that the Li/Me (Ni, Co, Mn) molar ratio was 1.05, and heat treated for 10 hours at 900° C. in an oxygen atmosphere to prepare $LiNi_{0.8}Co_{0.1}Mn_{0.1}O_2$, a lithium composite transition metal oxide. The prepared nickel-based lithium composite metal oxide was in the form of a pseudo-single particle composed of one to three nodules, and the average particle diameter (μm) of the nodules was 5.56 μm.

1 mole of $Co_3O_4$, a cobalt raw material, was added to 100 moles of the prepared nickel-based lithium composite metal oxide and the mixture was fired at 700° C. for 5 hours. The $D_{50}$ of the prepared positive electrode active material was 5.96 μm, and the XY/Z value was 2.80.

A positive electrode and a lithium secondary battery including the same were manufactured in the same manner as in Example 1, except that the positive electrode active material was used to manufacture the positive electrode.

Example 3

$Ni_{0.8}Co_{0.1}Mn_{0.1}$ $(OH)_2$ as a precursor was mixed with LiOH such that the Li/Me (Ni, Co, Mn) molar ratio was 1.05, and heat treated for 10 hours at 900° C. in an oxygen atmosphere to prepare $LiNi_{0.8}Co_{0.1}Mn_{0.1}O_2$, a lithium composite transition metal oxide. The prepared nickel-based lithium composite metal oxide was in the form of a pseudo-single particle composed of one to three nodules, and the average particle diameter (μm) of the nodules was 4.18 μm.

0.5 moles of $Co_3O_4$, a cobalt raw material, was added to 100 moles of the prepared nickel-based lithium composite metal oxide and the mixture was fired at 700° C. for 5 hours. The $D_{50}$ of the prepared positive electrode active material was 5.86 μm, and the XY/Z value was 1.07.

A positive electrode and a lithium secondary battery including the same were manufactured in the same manner as in Example 1, except that the positive electrode active material was used to manufacture the positive electrode.

Comparative Example 1

$Ni_{0.8}Co_{0.1}Mn_{0.1}$ $(OH)_2$ as a precursor was mixed with LiOH such that the Li/Me (Ni, Co, Mn) molar ratio was 1.05, and heat treated for 10 hours at 920° C. in an oxygen atmosphere to prepare $LiNi_{0.8}Co_{0.1}Mn_{0.1}O_2$, a lithium composite transition metal oxide. The prepared nickel-based lithium composite metal oxide was in the form of a pseudo-single particle composed of several nodules, and the average particle diameter (μm) of the nodules was 2.15 μm.

0.67 moles of $Co_3O_4$, a cobalt raw material, were added to 100 moles of the prepared nickel-based lithium composite metal oxide, and the mixture was fired at 700° C. for 5 hours.

The $D_{50}$ of the prepared positive electrode active material was 7.93 μm, and the XY/Z value was 0.54.

A positive electrode and a lithium secondary battery including the same were manufactured in the same manner as in Example 1, except that the positive electrode active material was used to manufacture the positive electrode.

Comparative Example 2

$Ni_{0.8}Co_{0.1}Mn_{0.1}(OH)_2$ as a precursor was mixed with LiOH such that the Li/Me (Ni, Co, Mn) molar ratio was 1.05, and heat treated for 10 hours at 920° C. in an oxygen atmosphere to prepare $LiNi_{0.8}Co_{0.1}Mn_{0.1}O_2$, a lithium composite transition metal oxide. The prepared nickel-based lithium composite metal oxide was in the form of a pseudo-single particle composed of several nodules, and the average particle diameter (μm) of the nodules was 1.1 μm.

1 moles of $Co_3O_4$, a cobalt raw material, were added to 100 moles of the prepared nickel-based lithium composite metal oxide, and the mixture was fired at 700° C. for 5 hours. The $D_{50}$ of the prepared positive electrode active material was 6.38 μm, and the XY/Z value was 0.52.

A positive electrode and a lithium secondary battery including the same were manufactured in the same manner as in Example 1, except that the positive electrode active material was used to manufacture the positive electrode.

Comparative Example 3

$Ni_{0.8}Co_{0.1}Mn_{0.1}(OH)_2$ as a precursor was mixed with LiOH such that the Li/Me (Ni, Co, Mn) molar ratio was 1.05, and heat treated for 10 hours at 920° C. in an oxygen atmosphere to prepare $LiNi_{0.8}Co_{0.1}Mn_{0.1}O_2$, a lithium composite transition metal oxide. The prepared nickel-based lithium composite metal oxide was in the form of a pseudo-single particle composed of several nodules, and the average particle diameter (μm) of the nodules was 1.1 μm.

2 moles of $Co_3O_4$, a cobalt raw material, were added to 100 moles of the prepared nickel-based lithium composite metal oxide, and the mixture was fired at 700° C. for 5 hours. The $D_{50}$ of the prepared positive electrode active material was 3.15 μm, and the XY/Z value was 4.305.

A positive electrode and a lithium secondary battery including the same were manufactured in the same manner as in Example 1, except that the positive electrode active material was used to manufacture the positive electrode.

Comparative Example 4

$Ni_{0.8}Co_{0.1}Mn_{0.1}(OH)_2$ as a precursor was mixed with LiOH such that the Li/Me (Ni, Co, Mn) molar ratio was 1.05, and heat treated for 10 hours at 900° C. in an oxygen atmosphere to prepare $LiNi_{0.8}Co_{0.1}Mn_{0.1}O_2$, a lithium composite transition metal oxide. The prepared nickel-based lithium composite metal oxide was in the form of a pseudo-single particle composed of one to three nodules, and the average particle diameter (μm) of the nodules was 3.05 μm.

0.67 moles of $Co_3O_4$, a cobalt raw material, were added to 100 moles of the prepared nickel-based lithium composite metal oxide and the mixture was fired at 700° C. for 5 hours. The $D_{50}$ of the prepared positive electrode active material was 3.50 μm, and the XY/Z value was 1.726.

A positive electrode and a lithium secondary battery including the same were manufactured in the same manner as in Example 1, except that the positive electrode active material was used to manufacture the positive electrode.

Comparative Example 5

$Ni_{0.8}Co_{0.1}Mn_{0.1}(OH)_2$ as a precursor was mixed with LiOH such that the Li/Me (Ni, Co, Mn) molar ratio was 1.05, and heat treated for 10 hours at 900° C. in an oxygen atmosphere to prepare $LiNi_{0.8}Co_{0.1}Mn_{0.1}O_2$, a lithium composite transition metal oxide. The prepared nickel-based lithium composite metal oxide was in the form of a pseudo-single particle composed of one to three nodules, and the average particle diameter (μm) of the nodules was 1.69 μm.

1 mole of $Co_3O_4$, a cobalt raw material, was added to 100 moles of the prepared nickel-based lithium composite metal oxide and the mixture was fired at 700° C. for 5 hours. The $D_{50}$ of the prepared positive electrode active material was 5.76 μm, and the XY/Z value was 0.88.

A positive electrode and a lithium secondary battery including the same were manufactured in the same manner as in Example 1, except that the positive electrode active material was used to manufacture the positive electrode.

Comparative Example 6

$Ni_{0.8}Co_{0.1}Mn_{0.1}(OH)_2$ as a precursor was mixed with LiOH such that the Li/Me (Ni, Co, Mn) molar ratio was 1.05, and heat treated for 10 hours at 900° C. in an oxygen atmosphere to prepare $LiNi_{0.8}Co_{0.1}Mn_{0.1}O_2$, a lithium composite transition metal oxide. The prepared nickel-based lithium composite metal oxide was in the form of a pseudo-single particle composed of one to three nodules, and the average particle diameter (μm) of the nodules was 2.26 μm.

1.5 mole of $Co_3O_4$, a cobalt raw material, was added to 100 moles of the prepared nickel-based lithium composite metal oxide and the mixture was fired at 700° C. for 5 hours. The $D_{50}$ of the prepared positive electrode active material was 3.15 μm, and the XY/Z value was 3.22.

A positive electrode and a lithium secondary battery including the same were manufactured in the same manner as in Example 1, except that the positive electrode active material was used to manufacture the positive electrode.

Experimental Example 1—Lifespan Properties Evaluation

Each of the lithium secondary batteries manufactured in Examples 1 to 3 and Comparative Examples 1 to 6 was charged to 4.25 V with a constant current of 0.5 C at 45° C., and discharged to 2.5 V with a constant current of 0.5 C, wherein the charge/discharge was set to one cycle, and the capacity retention rate after 50 cycles was measured and is shown in Table 1 below.

TABLE 1

|  | Capacity retention rate (%) after 50 cycles |
| --- | --- |
| Example 1 | 92.9 |
| Example 2 | 91.1 |
| Example 3 | 90.8 |
| Comparative Example 1 | 86.9 |
| Comparative Example 2 | 85.0 |
| Comparative Example 3 | 88.3 |
| Comparative Example 4 | 88.2 |
| Comparative Example 5 | 86.4 |
| Comparative Example 6 | 86.7 |

As shown in Table 1 above, it has been confirmed that the lithium secondary batteries of Examples 1 to 3 manufactured by including a positive electrode active material which satisfies [Equation 1] $1 \leq XY/Z \leq 3$, and has a $D_{50}$ (μm) of 5 μm to 12 μm have excellent lifespan properties compared to the lithium secondary batteries of Comparative Examples 1 to 6 manufactured by including a positive electrode active material in which the $D_{50}$ (μm) of the positive electrode active material does not satisfy 5 μm to 12 μm.

Experimental Example 2—High-Temperature Storage Properties

Each of the positive electrode active materials prepared in Examples 1 to 3 and Comparative Examples 1 to 6, a carbon black conductive material, and a PVdF binder were mixed at a weight ratio of 96:2:2 in an N-methylpyrrolidone solvent to prepare a positive electrode mixture material (viscosity: 5000 mPa·s), and the mixture material was applied on one surface of an aluminum current collector, dried at 130° C., and then roll-pressed to manufacture a positive electrode. A lithium metal was used as a negative electrode.

A porous polyethylene separator was interposed between the positive electrode and the negative electrode manufactured as described above to manufacture an electrode assembly, and the electrode assembly was placed inside a case, and an electrolyte was injected into the case to manufacture a lithium secondary battery. At this time, the electrolyte was prepared by dissolving lithium hexafluorophosphate (LiPF$_6$) having a concentration of 1.0 M in an organic solvent composed of ethylene carbonate/ethyl methyl carbonate/diethylene carbonate (mixing volume ratio of EC/EMC/DEC=3/4/3). Each of the lithium secondary battery half cells manufactured as described above was charged in a CCCV mode until 0.2 C and 4.25 V (end current 1/20 C). After the charge, two charged positive electrodes and two polyethylene separators, which were obtained by disassembling the cell, were stacked alternately on a bottom plate of the coin cell, followed by injecting an electrolyte thereto, and then the coin cell was assembled again. Thereafter, gas generated by storing the coin cell at 70° C. for 2 weeks was measured using a gas chromatograph-mass spectrometer (GC-MS). The results are shown in Table 2 below.

TABLE 2

|  | Amount of gas generated for 2 weeks |
|---|---|
| Example 1 | 29 |
| Example 2 | 37 |
| Example 3 | 42 |
| Comparative Example 1 | 79 |
| Comparative Example 2 | 68 |
| Comparative Example 3 | 75 |
| Comparative Example 4 | 62 |
| Comparative Example 5 | 67 |
| Comparative Example 6 | 69 |

As shown in Table 2 above, it has been confirmed that the lithium secondary batteries of Examples 1 to 3 manufactured by including a positive electrode active material which satisfies [Equation 1] $1 \leq XY/Z \leq 3$, and has a $D_{50}$ (μm) of 5 μm to 12 μm have excellent high-temperature storage properties compared to the lithium secondary batteries of Comparative Examples 1 to 6 manufactured by including a positive electrode active material which does not satisfy Equation 1 above or in which the $D_{50}$ (μm) of the positive electrode active material does not satisfy 5 μm to 12 μm.

The invention claimed is:

1. A positive electrode active material comprising:
a nickel-based lithium composite metal oxide having a Ni content of 80 atm % or greater among transition metals except lithium, wherein the nickel-based lithium composite metal oxide is in a form of a single particle or pseudo-single particle; and
a coating layer positioned on a surface of the nickel-based lithium composite metal oxide, wherein the coating layer includes cobalt,
wherein the positive electrode active material satisfies Equation 1 below:

$$1 \leq XY/Z \leq 3 \qquad \text{[Equation 1]}$$

wherein, X (mol %) is a number of moles of Co in the coating layer based on 100 moles of the nickel-based lithium composite metal oxide, Y (μm) is an average particle diameter of nodules of the nickel-based lithium composite metal oxide, and Z (μm) is $D_{50}$ of the positive electrode active material, wherein Z is from 5 μm to 12 μm, and
wherein the nickel-based lithium composite metal oxide is represented by Formula 2 below:

$$Li_aNi_bCo_cM^1_dM^2_eO_2 \qquad \text{[Formula 2]}$$

wherein, $M^1$ is Mn, Al, or a combination thereof, $M^2$ is one or more selected from the group consisting of W, Y, Ba, Ca, Ti, Mg, Ta, and Nb, and $0.8 \leq a \leq 1.2$, $0.8 \leq b < 1$, $0 < c < 0.2$, $0 < d < 0.2$, and $0 \leq e \leq 0.1$.

2. The positive electrode active material of claim 1, wherein X is from 1 mol % to 5 mol %.

3. The positive electrode active material of claim 1, wherein Y is from 1 μm to 10 μm.

4. The positive electrode active material of claim 1, wherein a ratio of Z to Y (Z/Y) is from 1 to 3.

5. The positive electrode active material of claim 1, wherein the positive electrode active material comprises a compound other than the nickel-based lithium composite metal oxide of Formula 2 in an amount ranging from 1 mol % to 5 mol % with respect to the nickel-based lithium composite metal oxide.

6. The positive electrode active material of claim 1, wherein the nickel-based lithium composite metal oxide has an average crystallite size ranging from 170 nm to 300 nm.

7. The positive electrode active material of claim 1, wherein the nickel-based lithium composite metal oxide has a strain value ranging from $200 \times 10^{-6}$ to $380 \times 10^{-6}$.

8. A positive electrode comprising a positive electrode active material layer including the positive electrode active material of claim 1.

9. The positive electrode of claim 8, wherein the positive electrode active material is included in an amount of 90 wt % to 100 wt % with respect to a total weight of the positive electrode active material layer included in the positive electrode.

10. The positive electrode of claim 8, wherein a ratio of the positive electrode active material having a size of from 5 μm to 7 μm with respect to an entire positive electrode active material is 80 vol % or greater.

11. A lithium secondary battery comprising the positive electrode of claim 9; a negative electrode; and an electrolyte.

* * * * *